United States Patent [19]
Coffield

[11] Patent Number: 5,141,191
[45] Date of Patent: Aug. 25, 1992

[54] LICENSE PLATE HOLDER APPARATUS

[76] Inventor: James B. Coffield, 4052 Cambray Dr., Fayetteville, Ark. 72703

[21] Appl. No.: 754,636

[22] Filed: Sep. 4, 1991

[51] Int. Cl.⁵ ............................................. F16B 47/00
[52] U.S. Cl. ................................. 248/206.3; 248/309.1
[58] Field of Search ............... 248/206.3, 206.4, 206.2, 248/206.1, 205.5, 291, 317, 309.1, 467; 40/211, 200, 209, 597, 910; 224/277, 282, 311, 42.46 R

[56] References Cited

U.S. PATENT DOCUMENTS

| | | | |
|---|---|---|---|
| 1,483,640 | 2/1924 | Manning | 248/291 X |
| 1,647,803 | 11/1927 | Hodny et al. | 248/291 X |
| 1,683,645 | 9/1928 | Abbey | 248/206.3 X |
| 1,840,763 | 1/1932 | Benchley | 248/206.3 |
| 1,932,123 | 10/1933 | Spruill | 224/282 X |
| 2,691,837 | 10/1954 | Gove | 224/277 X |
| 2,803,810 | 8/1957 | Evans et al. | 40/211 X |
| 4,836,482 | 6/1989 | Sokol | 248/309.1 X |
| 4,863,130 | 9/1989 | Marks, Jr. | 248/683 X |

Primary Examiner—Karen J. Chotkowski
Attorney, Agent, or Firm—Leon Gilden

[57] ABSTRACT

An apparatus arranged for temporarily mounting a license plate proximate to a rear windshield portion of a passenger compartment relative to a self-propelled vehicle. The invention includes a "U" shaped bracket mounting suction cups to flanges extending outwardly of the "U" shaped bracket to permit temporary securement and storage of license plates during transport and testing of an associated vehicle. A modification of the invention includes the "U" shaped bracket mounted within a "U" shaped pivot plate, wherein the "U" shaped pivot plate mounts the "U" shaped bracket to permit securement of the "U" shaped bracket for ease of display relative to a rear windshield including a horizontal component to permit downward pivotment of the "U" shaped bracket for ease of visibility of a license plate mounted therewithin. A further modification of the invention includes the "U" shaped bracket including a pull cord mounted medially to a base leg thereof to permit remote lifting of the "U" shaped bracket for enhanced visibility during use of the self-propelled vehicle.

1 Claim, 5 Drawing Sheets

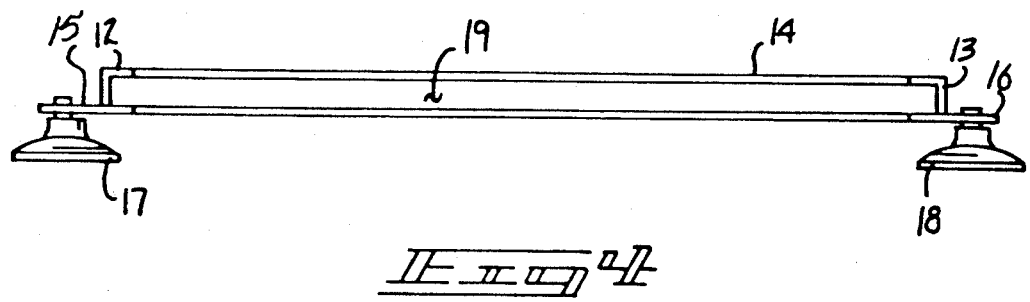
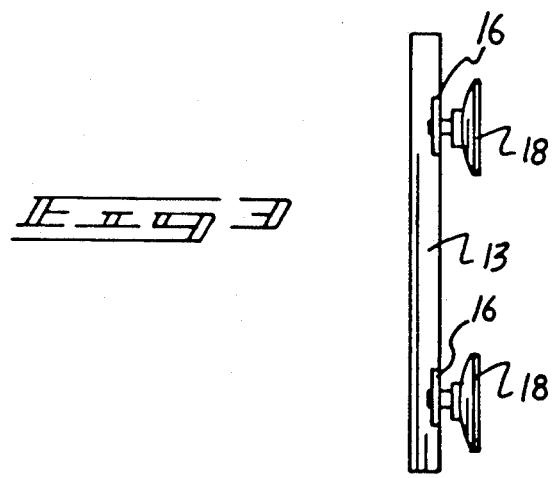
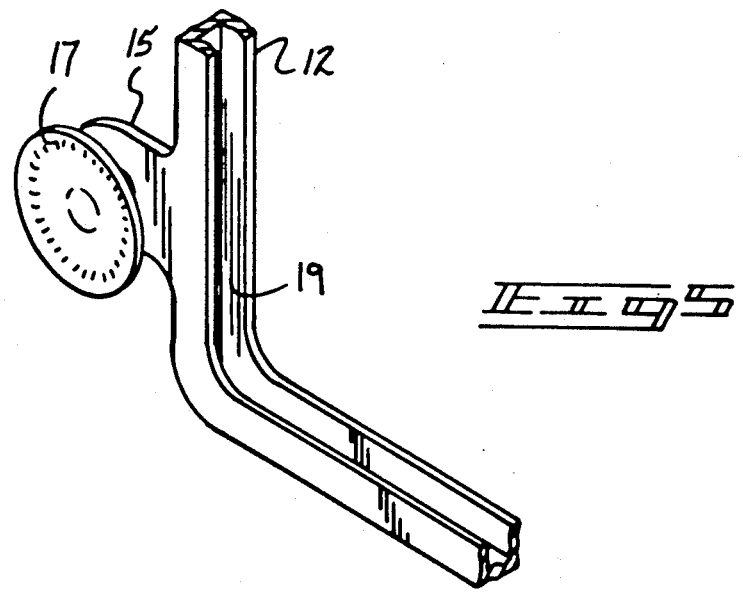

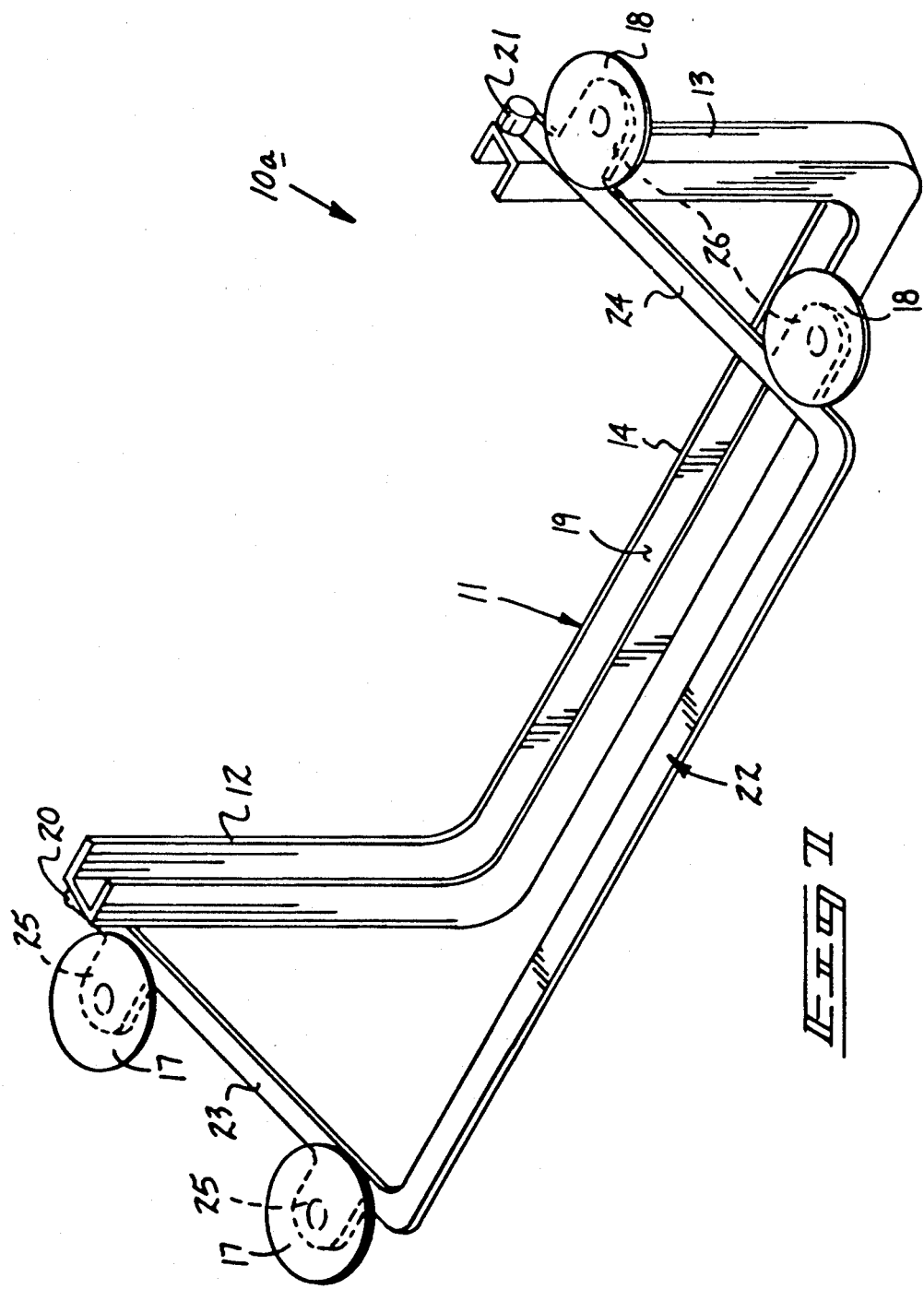

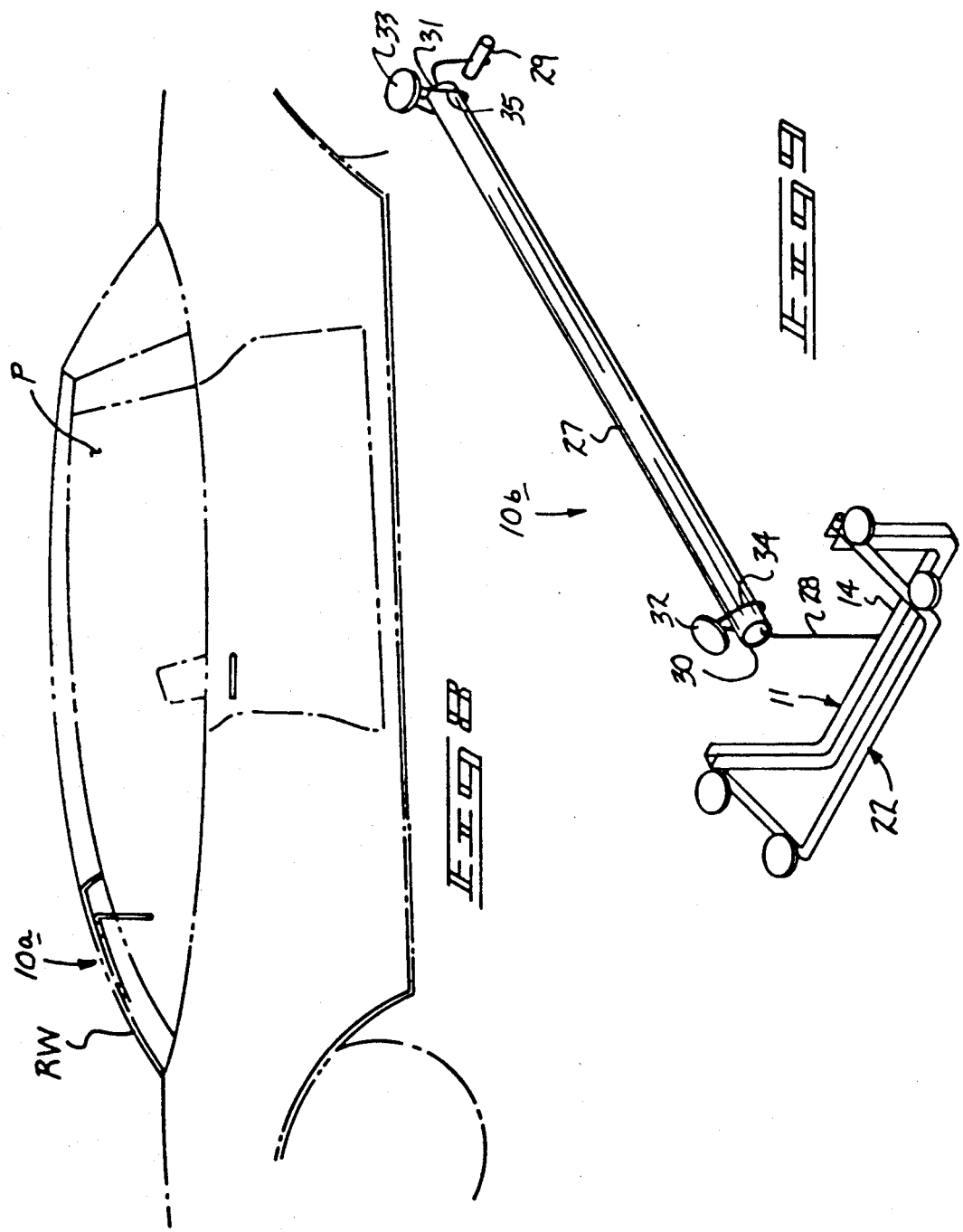

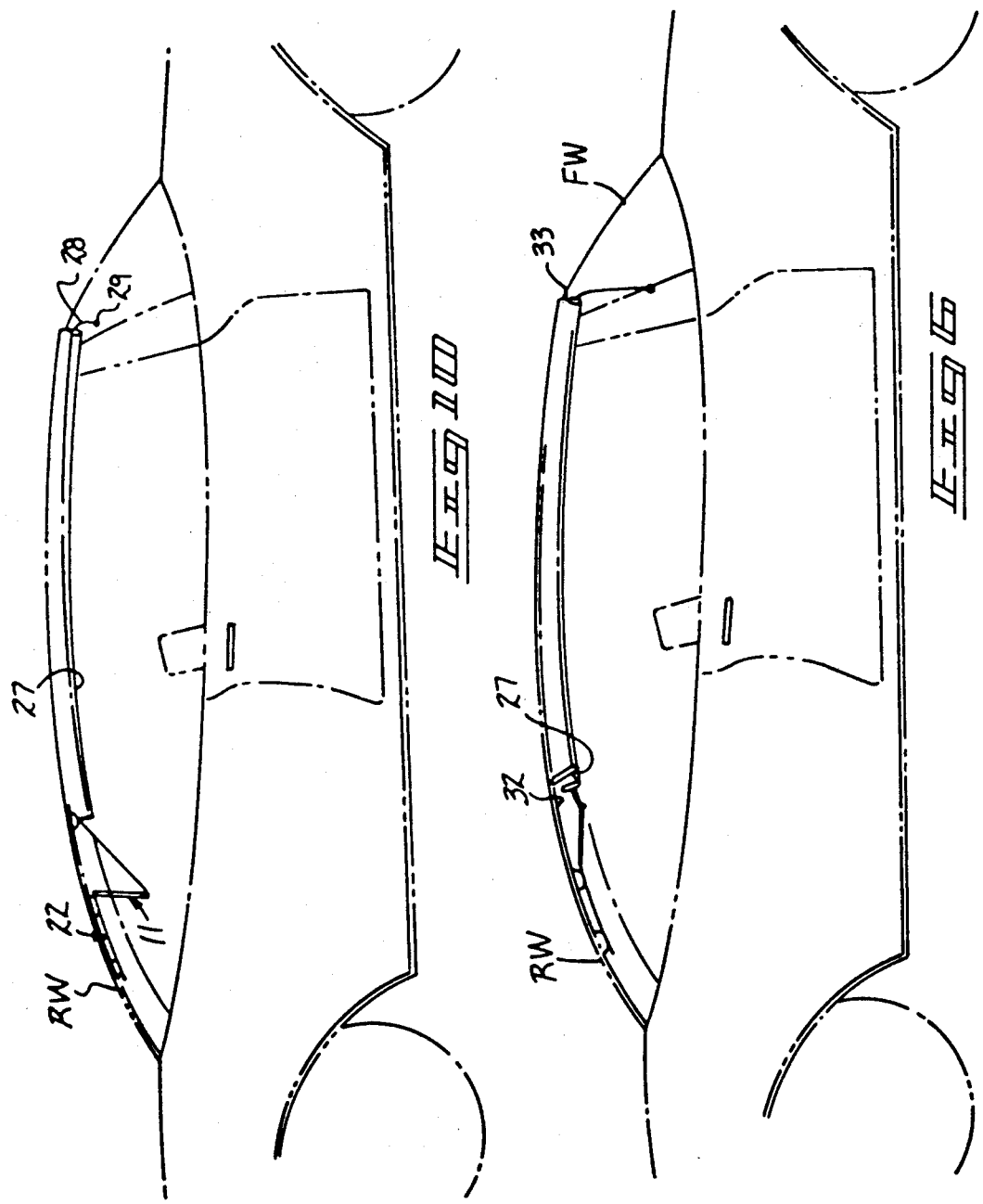

LICENSE PLATE HOLDER APPARATUS

BACKGROUND OF THE INVENTION

1. Field of the Invention

The field of invention relates to license plate holder apparatus, and more particularly pertains to a new and improved license plate holder apparatus wherein the same is arranged for the temporary positioning and mounting of a license plate relative to a rear windshield of an automobile to prevent tampering and unauthorized removal of the license plate during use of the vehicle.

2. Description of the Prior Art

Typically in the use of a vehicle such as by automotive dealers and the like, the license plate is mounted by magnets and the like exteriorly of an associated vehicle. The instant invention attempts to overcome deficiencies of the prior art by positioning the license plate holder within the passenger compartment, but mounted for visibility through a rear windshield portion of the automobile for ease of viewing of the license plate. Examples of prior art license plate support apparatus is exemplified in U.S. Pat. No. 4,011,675 to Herring wherein a removable license plate holder is arranged for temporary mounting to an associated vehicle utilizing mechanical fasteners directed to the framework of the license plate holder.

As such, it may be appreciated that there continues to be a need for a new and improved license plate holder apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of license plate holder apparatus now present in the prior art, the present invention provides a license plate holder apparatus wherein the same is arranged for the temporary mounting and positioning of a license plate within a passenger compartment of an associated self-propelled vehicle during temporary usage of the vehicle. As such, the general purpose of the present invention, which will be described subsequently in greater detail, is to provide a new and improved license plate holder apparatus which has all the advantages of the prior art license plate holder apparatus and none of the disadvantages.

To attain this, the present invention provides an apparatus arranged for temporarily mounting a license plate proximate to a rear windshield portion of a passenger compartment relative to a self-propelled vehicle. The invention includes a "U" shaped bracket mounting suction cups to flanges extending outwardly of the "U" shaped bracket to permit temporary securement and storage of license plates during transport and testing of an associated vehicle. A modification of the invention includes the "U" shaped bracket mounted within a "U" shaped pivot plate, wherein the "U" shaped pivot plate mounts the "U " shaped bracket to permit securement of the "U" shaped bracket for ease of display relative to a rear windshield including a horizontal component to permit downward pivotment of the "U" shaped bracket for ease of visibility of a license plate mounted therewithin. A further modification of the invention includes the "U" shaped bracket including a pull cord mounted medially to a base leg thereof to permit remote lifting of the "U" shaped bracket for enhanced visibility during use of the self-propelled vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structure, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved license plate holder apparatus which has all the advantages of the prior art license plate holder apparatus and none of the disadvantages.

It is another object of the present invention to provide a new and improved license plate holder apparatus which may be easily and efficiently manufactured and marketed.

It is a further object of the present invention to provide a new and improved license plate holder apparatus which is of a durable and reliable construction.

An even further object of the present invention is to provide a new and improved license plate holder apparatus which is susceptible of a low cost of manufacture with regard to both materials and labor, and which accordingly is then susceptible of low prices of sale to the consuming public, thereby making such license plate holder apparatus economically available to the buying public.

Still yet another object of the present invention is to provide a new and improved license plate holder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 2 in the direction indicated by the arrows.

FIG. 4 is an orthographic view, taken along the lines 4—4 of FIG. 2 in the direction indicated by the arrows.

FIG. 5 is an isometric illustration, partially in section, of the "U" shaped support bracket.

FIG. 6 is an orthographic side view of a modified aspect of the invention mounted within a passenger compartment of a vehicle.

FIG. 7 is an isometric illustration of a modified license plate holder apparatus contemplated by the invention.

FIG. 8 is an orthographic side view of the invention as set forth in FIG. 7 mounted within a passenger compartment of a vehicle.

FIG. 9 is an isometric illustration of a further modified aspect of the instant invention.

FIG. 10 is an orthographic side view of the invention, as illustrated in FIG. 9, mounted within a passenger compartment of a vehicle in a first position relative to the invention as set forth in FIG. 9 in the second position, as illustrated in FIG. 6.

DESCRIPTION OF THE PREFERRED EMBODIMENT

Figure 1:
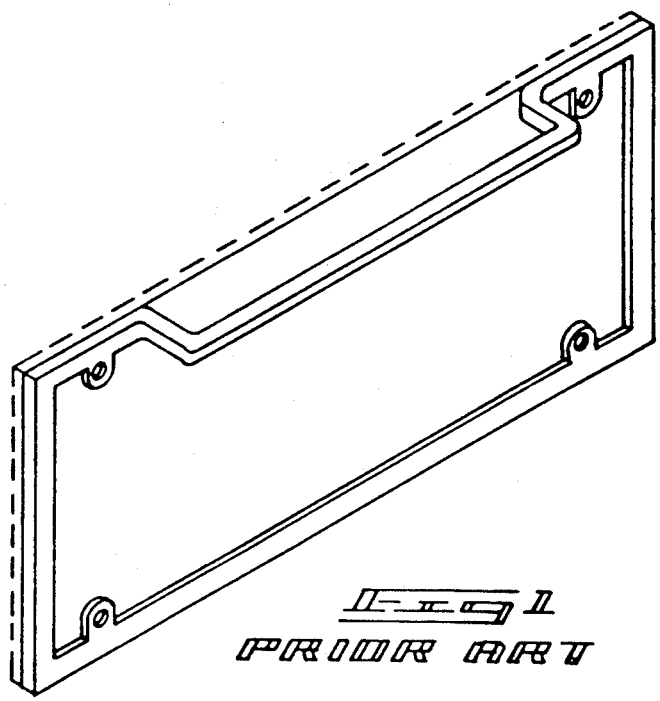
FIG. 1 is an isometric illustration of a prior art license plate holder.
Figure 2:
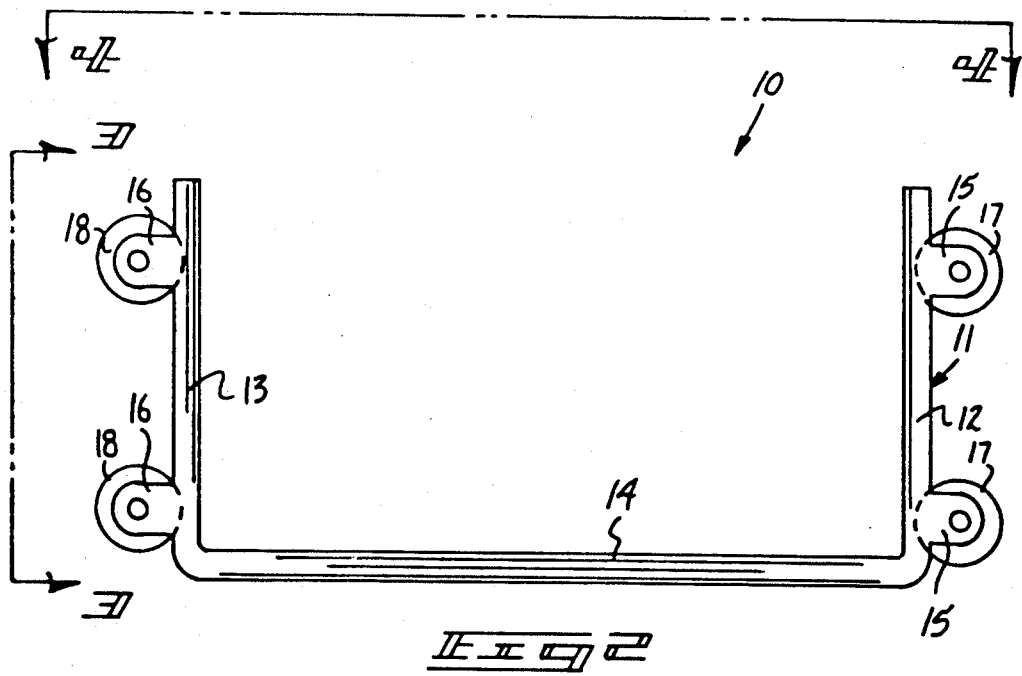
FIG. 2 is a frontal view taken in elevation of the invention.

With reference now to the drawings, and in particular to FIGS. 1 to 10 thereof, a new and improved license plate holder apparatus embodying the principles and concepts of the present invention and generally designated by the reference numerals 10, 10a, and 10b will be described.

FIG. 1 illustrates a prior art license plate holder apparatus as set forth and depicted in U.S. Pat. No. 4,011,675, wherein the license plate holder includes a handle arranged for positioning the license plate holder prior to mounting of the holder utilizing mechanical fasteners directed through the associated apertures into the body portion of an associated vehicle.

More specifically, the license plate holder apparatus 10 of the instant invention essentially comprises a rigid "U" shaped bracket 11 to include a right vertical leg 12 spaced from and parallel a left vertical leg 13 in a coextensive relationship relative to one another. A horizontal base leg 14 orthogonally intersects lower terminal ends of the right and left vertical legs 12 and 13. A pair of first flanges 15 are coplanar with a forward surface of the right vertical leg 12 extending orthogonally and laterally of the right vertical leg 12, with a pair of second flanges 16 coplanar with the forward surface of the left vertical leg 13 extending laterally of the left leg 13. Respective resilient first and second suction cups 17 and 18 are fixedly and orthogonally mounted to forward surfaces of the flanges 15 and 16 to extend forwardly of the forward surfaces of the right and left vertical legs 12 and 13, as well as the "U" shaped bracket 11, for mounting to an interior surface of an associated rear windshield RW of a type as illustrated in FIG. 8. A continuous groove 19 extends interiorly of the "U" shaped bracket 11 to define a "U" shaped groove that is coextensive with the right and left vertical legs 12 and 13, as well as the horizontal base leg 14 continuously within the "U" shaped bracket 11, as illustrated in FIG. 4 for example. A continuous groove 19 mounts a license plate therewithin for viewing through the rear windshield RW.

A modified apparatus 10a, as illustrated in the FIGS. 7 and 8, to include a "U" shaped perimeter pivot frame 22 that is coextensive with and positioned exteriorly of the "U" shaped bracket 11. The "U" shaped perimeter pivot frame 22 is comprised of a pivot frame right leg 23 parallel to a pivot frame left leg 24 orthogonally mounted to a pivot frame base leg to define an interior edge complementary to an exterior edge of the "U" shaped bracket 11. Upper terminal ends of the respective right and left pivot frame legs 23 and 24 are pivotally mounted by means of a respective right and left pivot axle 20 and 21 to an exterior surface of the respective right and left vertical legs 12 and 13 of the "U" shaped bracket 11. The pivot axles 20 and 21 extend exteriorly of and orthogonally relative to an outer surface of the "U" shaped bracket 11, as illustrated in FIG. 7. In this manner, the "U" shaped pivot frame 22 includes respective right and left leg flanges 25 and 26 extending coplanar with and laterally of the respective right and left pivot frame legs 23 and 24 to mount the respective first and second suction cups thereon permitting the "U" shaped pivot frame 22 to be mounted to an interior surface of the rear windshield RW permitting the "U" shaped bracket to pivot downwardly for enhanced ease of visibility through the slanted rear windshield RW, as illustrated in FIG. 8.

The positioning of a vehicular license plate through the rear windshield at times can provide an obstruction in various traffic conditions. To accommodate this, the organization may further include an assemblage as illustrated by the modified construction 10b as set forth in the FIGS. 6, 9, and 10. Included in the organization 10b is a flexible mounting tube 27. A pull cord 28 is directed through the mounting tube 27, with the mounting tube including a mounting tube rear end 30 and a mounting tube forward end 31. The pull cord 28 extends through the mounting tube rear end 30 and mounted medially to the horizontal base leg 14. The pull cord simultaneously extends forwardly of the mounting tube forward end 41, with a pull cord handle 29 mounted thereto. The pull cord 28 accordingly permits pivotment of the "U" shaped bracket 11 from the first position of a generally vertical orientation to a second position, as illustrated in FIG. 6, of a generally horizontal orientation to permit removal of the "U" shaped bracket 11 as an obstruction. To mount the mounting tube 27 to the front windshield FW and the rear windshield RW, the mounting tube includes a resilient rear mounting band 34 mounted to the mounting tube rear end 30, with a resilient forward mounting band 35 mounted to the forward end 31, with the rear and forward mounting bands 34 and 35 having respective rear and forward suction cups 32 and 33 mounted respectively thereto, wherein the rear and forward suction cups are secured medially of the rear and forward windshields RW and FW positioning the pull cord handle 29 for ease of use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A license plate holder apparatus for mounting within an automotive vehicle, wherein the automotive vehicle includes a passenger compartment, the passenger compartment including a rear windshield spaced from a front windshield, the apparatus comprising, a "U" shaped bracket, the "U" shaped bracket including a right vertical leg spaced from and parallel a left vertical leg, the right and left vertical legs arranged in a coextensive relationship, with the "U" shaped bracket including a horizontal base leg orthogonally intersecting a lower terminal end of the right vertical leg and the left vertical leg, and a continuous "U" shaped groove directed within the "U" shaped bracket, and mounting means mounted to the "U" shaped bracket for securement of the "U" shaped bracket to an interior surface of the rear windshield, and the mounting means includes a "U" shaped perimeter pivot frame, the pivot frame extending coextensively with and exteriorly of the "U" shaped bracket, the "U" shaped pivot frame including a pivot frame right leg spaced from, parallel, and coextensive with a pivot frame left leg, and a right pivot axle mounted to an upper terminal end of the right vertical leg exteriorly thereof, and a left pivot axle mounted orthogonally to an upper terminal end of the right vertical leg, wherein the right pivot axle and the left pivot axle are coaxially aligned relative to one another, and the right pivot axle pivotally mounts an upper terminal end of the pivot frame right leg, and the left pivot axle pivotally mounts an upper terminal end of the pivot frame right leg, and the pivot frame right leg includes a plurality of right leg flanges extending exteriorly of and coplanar with the right leg and a plurality of left leg pivot frame flanges mounted coplanar with and extending exteriorly of the pivot frame left leg, wherein the left leg pivot frame flanges and the right leg pivot frame flanges are coplanar relative to one another, and each of the flanges includes a suction cup member mounted orthogonally to each of the flanges for suctional engagement with the interior surface of the rear windshield, and a flexible mounting tube, the mounting tube including a mounting tube forward end and a mounting rear end, the mounting tube rear end including a resilient rear mounting band, and the mounting tube forward end including a resilient forward mounting band, the resilient rear mounting band including a rear suction cup, and the resilient forward mounting band including a forward suction cup, wherein the resilient rear suction cup is arranged for securement to the interior surface of the rear windshield and the resilient forward suction cup is arranged for suctional engagement with an interior surface of the front windshield, and a pull cord, the pull cord including a pull cord first end extending exteriorly of the mounting tube rear end and secured medially of the "U" shaped bracket horizontal base leg, and the pull cord extending exteriorly of the mounting tube to define a pull cord second end, wherein the pull cord second end includes a pull cord handle mounted thereto, wherein the pull cord handle is positioned exteriorly of the mounting tube, wherein the resilient rear mounting band and the resilient forward mounting band permit extension of the rear suction cup and the forward suction cup for engagement with the rear windshield and the front windshield respectively.

* * * * *